United States Patent
Miyai et al.

(10) Patent No.: US 11,039,025 B2
(45) Date of Patent: Jun. 15, 2021

(54) DISPLAY INPUT DEVICE AND IMAGE FORMING APPARATUS

(71) Applicant: KYOCERA Document Solutions Inc., Osaka (JP)

(72) Inventors: Toshiya Miyai, Osaka (JP); Michiko Tashiro, Osaka (JP); Shinichi Nakanishi, Osaka (JP); Emi Tennichi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/996,360

(22) Filed: Aug. 18, 2020

(65) Prior Publication Data

US 2021/0058525 A1 Feb. 25, 2021

(30) Foreign Application Priority Data

Aug. 20, 2019 (JP) .............................. JP2019-150561

(51) Int. Cl.
*H04N 1/00* (2006.01)

(52) U.S. Cl.
CPC ..... *H04N 1/00482* (2013.01); *H04N 1/00384* (2013.01)

(58) Field of Classification Search
None
See application file for complete search history.

(56) References Cited

U.S. PATENT DOCUMENTS

2011/0267649 A1\* 11/2011 Akimoto ................. H04L 51/00
358/1.15
2013/0278960 A1\* 10/2013 Nishiyama ......... H04N 1/32122
358/1.14
2016/0269573 A1\* 9/2016 Sugita ................ H04N 1/32641

FOREIGN PATENT DOCUMENTS

JP 2007-221188 A 8/2007

\* cited by examiner

*Primary Examiner* — Martin Mushambo
(74) *Attorney, Agent, or Firm* — Stein IP, LLC (57) ABSTRACT

The display input device includes an operation display part, a call button correspondingly associated with a default process of displaying a setting screen in the operation display part, and a controller for, when the call button is operated while another screen other than the setting screen is displayed, executing the default process to display the setting screen. The controller decides whether or not a changeover condition has been satisfied during display of the setting screen, and in a case where the call button is operated for a second time during the display of the setting screen, on condition that the changeover condition has been satisfied, the controller executes a process corresponding to a status of use of the operation display part during a period lasting from execution of the default process until the second-time operation of the call button.

13 Claims, 9 Drawing Sheets

DISPLAY INPUT DEVICE AND IMAGE FORMING APPARATUS

INCORPORATION BY REFERENCE

This application is based upon and claims the benefit of priority from the corresponding Japanese Patent Application No. 2019-150561 filed on Aug. 20, 2019, the entire contents of which are incorporated herein by reference.

BACKGROUND

The present disclosure relates to a display input device and an image forming apparatus.

An image forming apparatus accepts, from a user, setting operations related to a job to execute the job on a basis of setting contents set by the setting operations. In such an image forming apparatus, a display input device is to be provided to accept setting operations from the user.

As an example, a conventional image forming apparatus is equipped with a plurality of functions. Also, a conventional display input device is provided with a plurality of call buttons (hardware buttons).

In the conventional image forming apparatus, the call buttons are associated with the functions each in one-to-one correspondence. When the user operates any one of the call buttons, a setting screen for a function corresponding to the call button operated by the user is displayed.

SUMMARY

A display input device according to a first aspect of the present disclosure includes an operation display part, a call button, and a controller. The operation display part displays information thereon and accepts operations from a user. The call button is correspondingly associated with a default process of displaying, in the operation display part, a setting screen for accepting a setting operation related to a job of a function of user's designation. When the call button is operated while another screen other than the setting screen is displayed in the operation display part, the controller executes the default process correspondingly associated with the call button to make the setting screen displayed in the operation display part. The controller decides whether or not a changeover condition has been satisfied during display of the setting screen, and in a case where the call button is operated for a second time during the display of the setting screen, on condition that the changeover condition has been satisfied, the controller executes a process corresponding to a status of use of the operation display part during a confirmation period lasting from execution of the default process triggered by an operation of the call button until the second-time operation of the call button.

An image forming apparatus according to a second aspect of the disclosure includes the display input device as described above.

DETAILED DESCRIPTION

<Configuration of Image Forming Apparatus>

Figure 1:
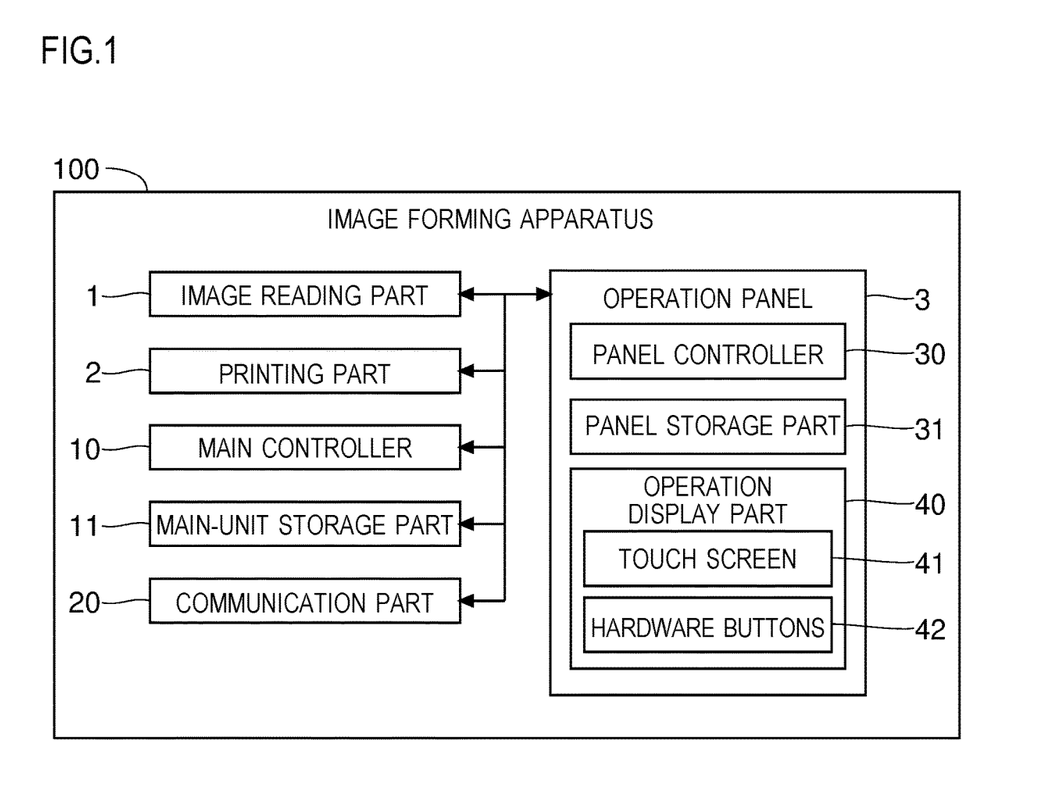
FIG. 1 is a diagram showing a configuration of an image forming apparatus equipped with an operation panel according to one embodiment of the present disclosure.

As shown in FIG. 1, an image forming apparatus 100 according to an embodiment is equipped with an image reading part 1 and a printing part 2. The image reading part 1 reads an original document to generate image data of the document. The printing part 2 prints out, onto a paper sheet, an image based on image data (e.g., image data of the document read by the image reading part 1).

Figure 2:
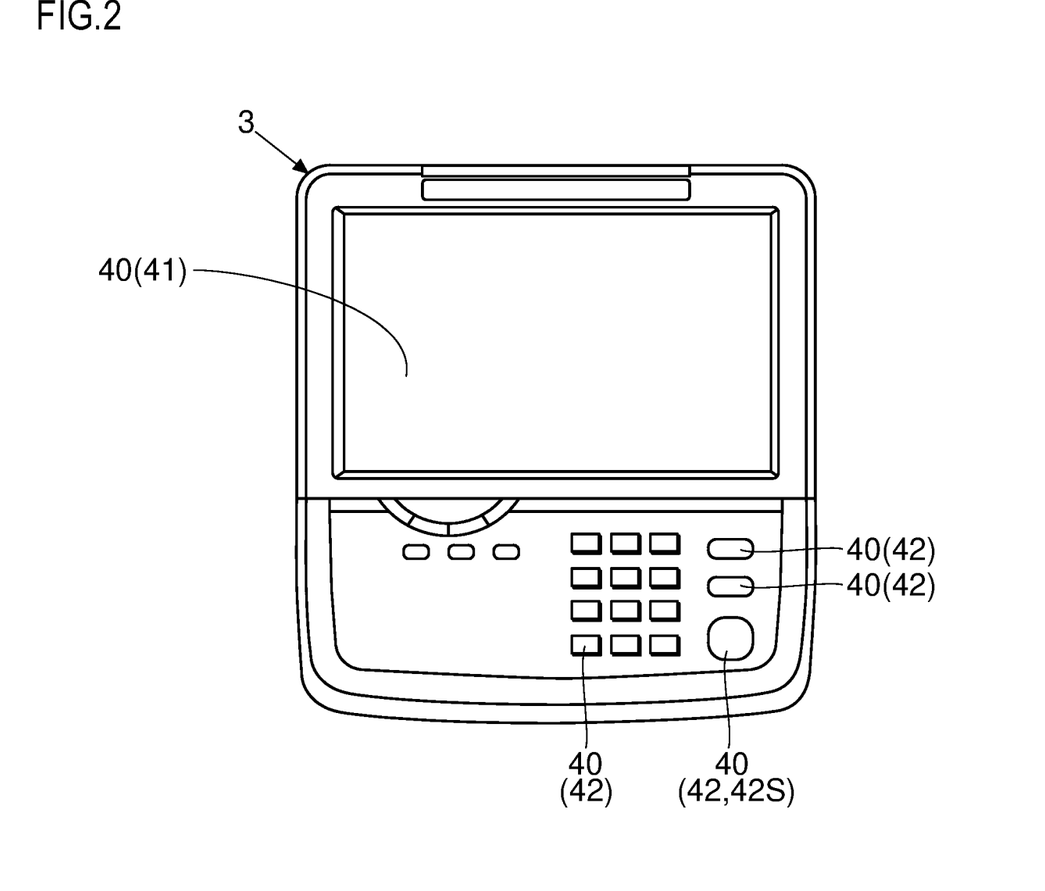
FIG. 2 is a view showing a configuration of the operation panel according to one embodiment of the disclosure.

The image forming apparatus 100 is equipped with such an operation panel 3 as shown in FIG. 2. The operation panel 3 corresponds to a 'display input device.'

The operation panel 3 includes an operation display part 40. The operation display part 40 is composed of a touch screen 41 and hardware buttons 42.

The touch screen 41 includes a display panel and a touch panel. The display panel may be either a liquid crystal display panel or an organic EL display panel. The touch panel is placed on a top surface of the display panel. The touch screen 41 displays various types of information on the display panel. The touch screen 41 also accepts operations from a user via the touch panel.

The hardware buttons 42 are provided in plurality on the operation panel 3. Among the plurality of hardware buttons 42 is a start button 42S. The start button 42S accepts from the user a start operation that instructs a start of a job (copying job, sending job, etc.).

Reverting to FIG. 1, the image forming apparatus 100 includes a main controller 10 and a main-unit storage part 11. The main controller 10 controls the image forming apparatus 100. The main-unit storage part 11 is connected to the main controller 10. The main controller 10 performs data writing into the main-unit storage part 11 as well as data reading from the main-unit storage part 11.

The image forming apparatus 100 also includes a communication part 20. The communication part 20 is connected to external devices via a LAN or other network. The main controller 10 transmits data to external devices by using the communication part 20.

The operation panel 3 includes a panel controller 30 and a panel storage part 31. The panel controller 30 corresponds to a 'controller.' The panel controller 30 includes a CPU. The panel storage part 31 includes ROM, RAM or the like. The panel controller 30 controls the operation panel 3. The panel controller 30 performs data writing into the panel storage part 31 as well as data reading from the panel storage part 31.

The panel controller 30 is connected to the main controller 10. The panel controller 30 receives instructions from the main controller 10 to control the operation display part 40. The panel controller 30 controls display actions of the touch screen 41. The panel controller 30 further detects operations on the touch screen 41 as well as operations on the hardware buttons 42. The panel controller 30 transmits to the main controller 10 an operation signal indicative of a detected operation.

<Setting Screens>

The image forming apparatus 100 is equipped with a plurality of functions. Hereinbelow, it is assumed that the image forming apparatus 100 is equipped with copying function, sending function and box function, as an example.

The image forming apparatus 100 executes jobs of the individual functions. A job of the copying function (hereinafter, referred to as copying job) is to print, on a paper sheet, an image based on image data of a document read by the image reading part 1. A job of the sending function (hereinafter, referred to as sending job) is to send to an external device image data of a document read by the image reading part 1.

Jobs of the box function (hereinafter, referred to as box job) include, for example, a box printing job and a box sending job. The box printing job is to print, onto a paper sheet, an image based on image data stored in a specified folder (storage area), which is named box, of the main-unit storage part 11. The box sending job is to send to an external device image data stored in a specified folder of the main-unit storage part 11.

It is designated by a user which is to be put into use among the plurality of functions (copying function, sending function and box function) provided on the image forming apparatus 100. The operation panel 3 accepts an operation of designating a function.

For example, when the operation panel 3 is activated (where returns from sleep mode are included), the panel controller 30 displays an unshown home screen in the operation display part 40. Provided in the home screen are, for example, buttons identical to call buttons B (software buttons) provided in later-described setting screens 400 (see FIGS. 3 to 5). The call buttons B are provided in plurality. A plurality of call buttons B (B1, B2 and B3) correspond to a plurality of functions, respectively. The call button B1 corresponds to the copying function. The call button B2 corresponds to the sending function. The call button B3 corresponds to the box function.

When any one of the call buttons B in the home screen is operated, the panel controller 30 displays, in the operation display part 40, a setting screen 400 (see FIGS. 3 to 5) for accepting setting operations related to a job of the function corresponding to the operated call button B. The operation display part 40 accepts, from a user, setting operations related to a job of the function corresponding to the setting screen 400 being under display.

Execution of setting operations allows the user to change, from default values to others, individual setting values of plural setting items related to the job of the function corresponding to the setting screen 400 being under display. That is, a setting operation is an operation of changing a set value of a setting item from default value to another. Set values for which no setting operation has been executed are retained at their default values.

Figure 3:
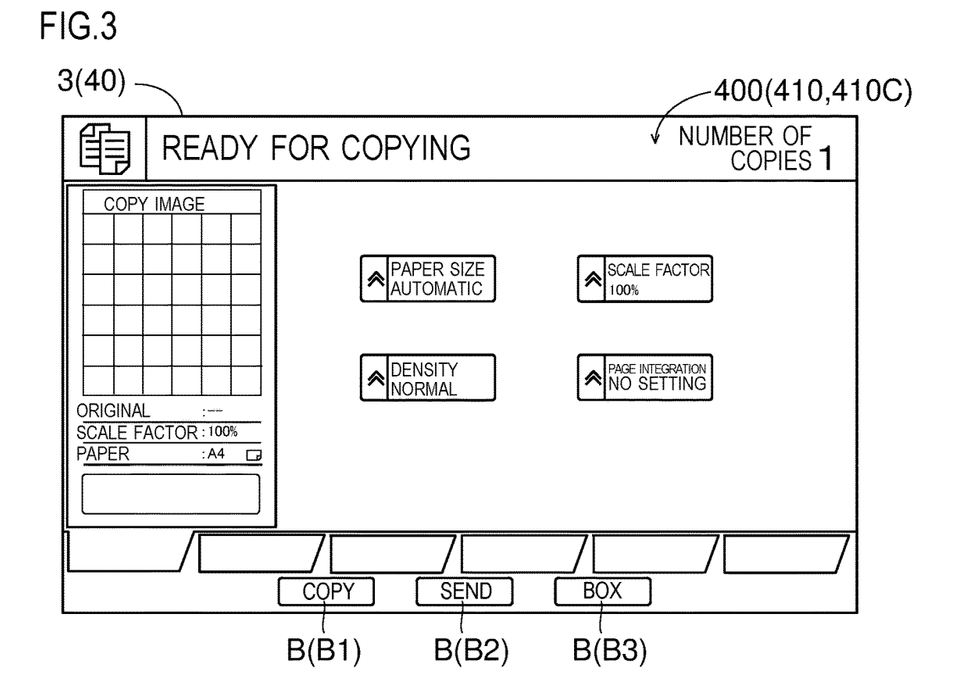
FIG. 3 is a view showing a setting screen (basic setting screen for copying function) to be displayed on the operation panel according to one embodiment of the disclosure.

When the call button B1 in the home screen is operated, the panel controller 30 displays, in the operation display part 40, such a copying screen 410C as shown in FIG. 3 as a setting screen 400. The copying screen 410C is a screen for accepting setting operations related to a copying job. The copying screen 410C allows the user, for example, to set a set value (number of copies) for a setting item 'NUMBER OF PRINT COPIES.' Entering a numerical value by using the ten keys (hardware buttons 42) in the operation display part 40 allows the entered numerical value to be set as a number of print copies.

Figure 4:
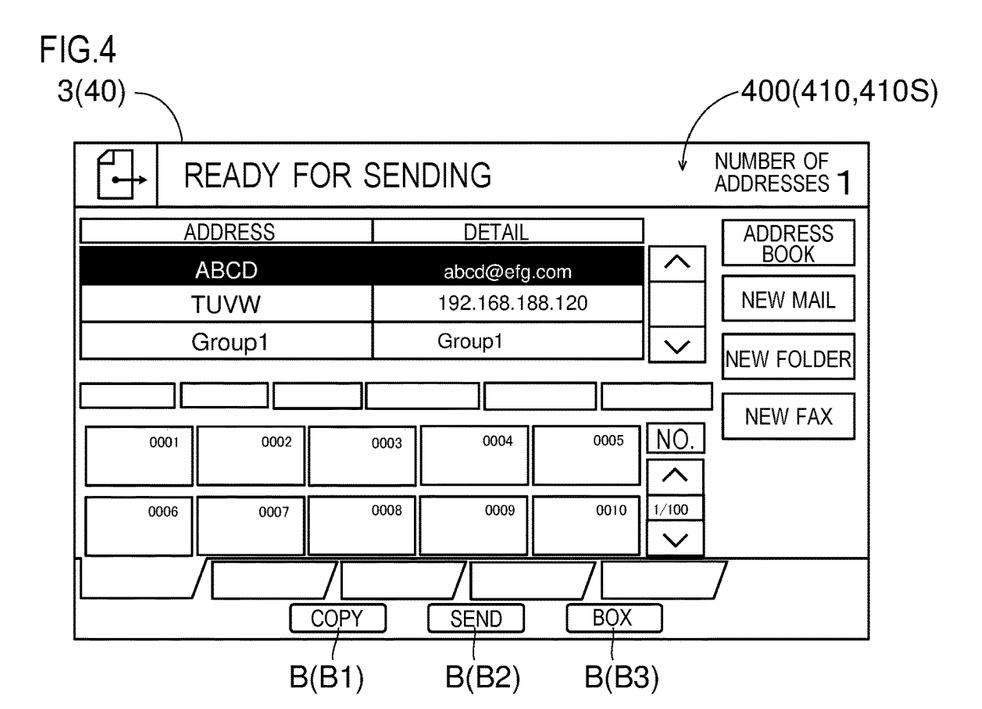
FIG. 4 is a view showing a setting screen (basic setting screen for sending function) to be displayed on the operation panel according to one embodiment of the disclosure.

When the call button B2 in the home screen is operated, the panel controller 30 displays, in the operation display part 40, such a sending screen 410S as shown in FIG. 4 as a setting screen 400. The sending screen 410S is a screen for accepting setting operations related to a sending job. The sending screen 410S allows the user, for example, to set a set value (address) of a setting item 'DATA SENDING ADDRESS.'

Figure 5:
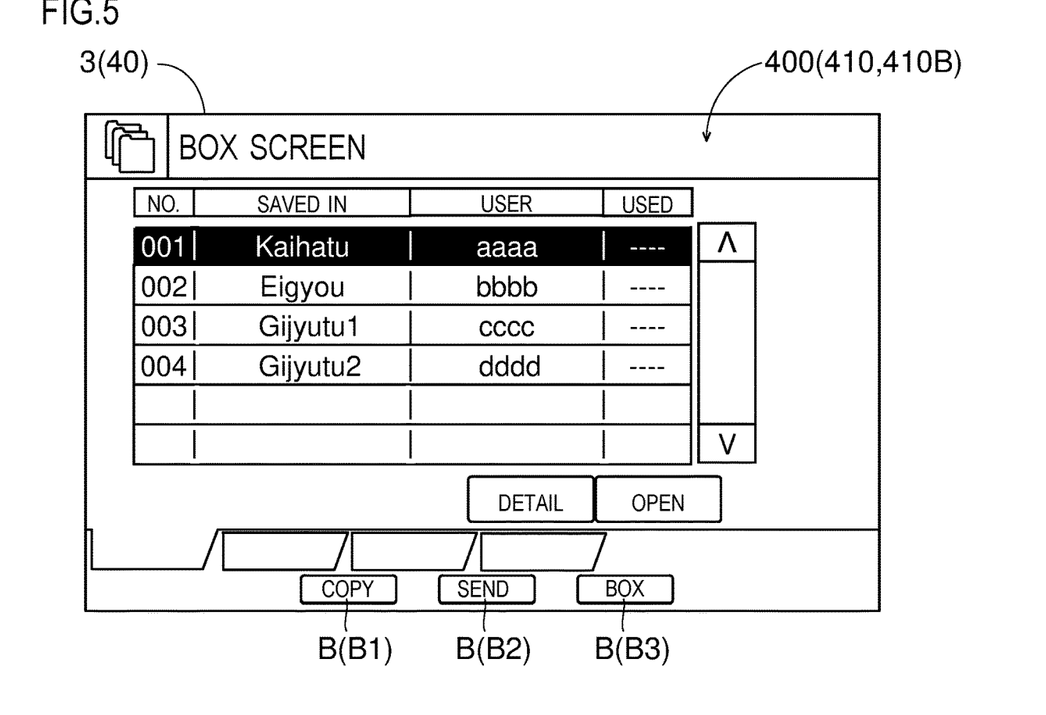
FIG. 5 is a view showing a setting screen (basic setting screen for box function) to be displayed on the operation panel according to one embodiment of the disclosure.

When the call button B3 in the home screen is operated, the panel controller 30 displays, in the operation display part 40, such a box screen 410B as shown in FIG. 5 as a setting screen 400. The box screen 410B is a screen for accepting setting operations related to a box job. The box screen 410B allows the user, for example, to select a folder (box) to be used for the box job.

In this connection, there are provided plural setting screens 400 for each function. The setting screens 400 (copying screen 410C, sending screen 410S and box screen 410B) shown in FIGS. 3 to 5 are basic setting screens each of which is to be first displayed when a corresponding call button B is operated. The copying screen 410C shown in FIG. 3 is a basic setting screen of the copying function. The sending screen 410S shown in FIG. 4 is a basic setting screen of the sending function. The box screen 410B shown in FIG. 5 is a basic setting screen of the box function. Hereinafter, on condition that particular discrimination thereamong is unnecessary, the copying screen 410C, the sending screen 410S and the box screen 410B will be referred to generically as basic setting screen with reference sign 410 added thereto.

Figure 6:
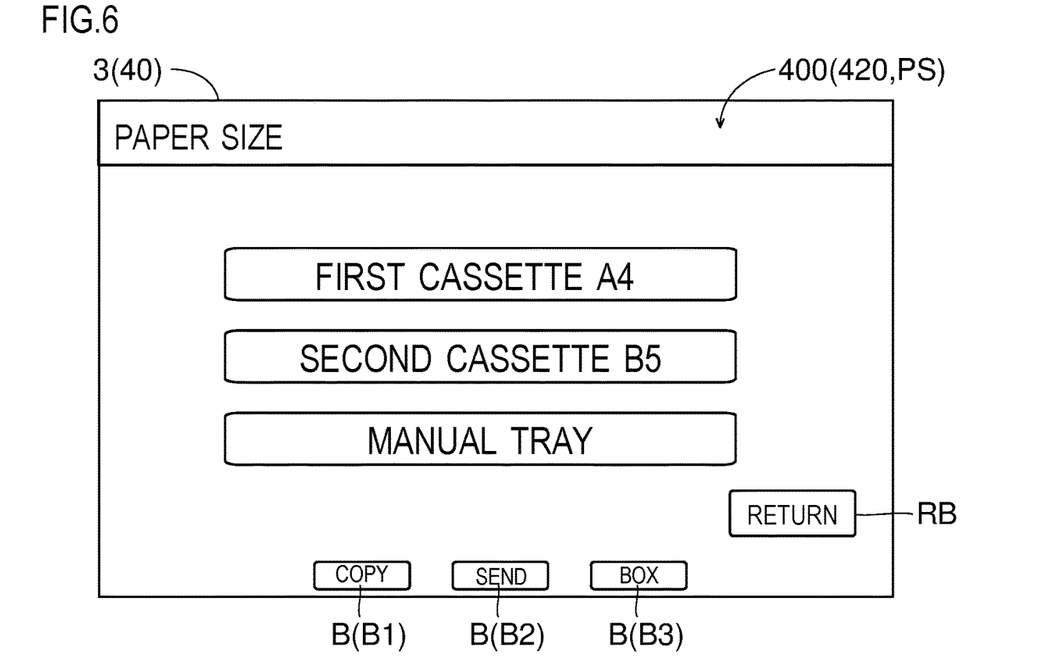
FIG. 6 is a view showing a setting screen (detail setting screen for copying function) to be displayed on the operation panel according to one embodiment of the disclosure.

In conjunction with the setting screens 400 of the individual functions, there are provided detail setting screens 420 (see FIG. 6) positioned each at an order hierarchically lower than the basic setting screen 410. As a detail setting screen 420, a screen that is hierarchically one-order lower than the copying screen 410C is shown in FIG. 6. Hereinafter, this screen will be referred to as paper size screen, with reference sign PS added thereto.

The paper size screen PS is a screen corresponding to a setting item 'PAPER SIZE.' The paper size screen PS is displayed in the operation display part 40 when an operation is made on a software button described as 'PAPER SIZE' in the copying screen 410C. The paper size screen PS allows the user to set a paper size to be used in a copying job. For example, when an operation is made on a size selection button described as 'FIRST CASSETTE,' the paper size to be used in the copying job is set to A4 size.

Although not shown, other detail setting screens 420 of the copying function are available as well. Examples of those detail setting screens 420 are a detail setting screen 420 for accepting a setting of a setting item 'SCALE FACTOR,' a detail setting screen 420 for accepting a setting of a setting item 'DENSITY,' and a detail setting screen 420 for accepting a setting of a setting item 'PAGE INTEGRATION.'

The detail setting screen 420 of the sending function allows the user to set individual settings of plural setting items (sending form etc.) related to a sending job. In conjunction with the detail setting screen 420 of the box function, there are a detail setting screen 420 for box printing and a detail setting screen 420 for box sending. The detail setting screen 420 for box printing allows the user to execute individual settings of plural setting items related to a box printing job. The detail setting screen 420 for box sending allows the user to execute individual settings of plural setting items related to a box sending job.

In the detail setting screens 420, a return button RB is provided as shown in FIG. 6. The return button RB is provided in every detail setting screen 420 positioned at an order hierarchically lower than the basic setting screen 410. Upon detecting an operation on the return button RB, the panel controller 30 displays, in the operation display part 40, a screen positioned at an order hierarchically higher (hierarchically one-order higher) than the detail setting screen 420 being under display.

When an operation is made on the return button RB in a detail setting screen 420, at a hierarchically one-higher order of which a basic setting screen 410 exists, the basic setting screen 410 is displayed. When an operation is made on the return button RB in a detail setting screen 420, at a hierarchically one-higher order of which another detail setting screen 420 exists, the another detail setting screen 420 is displayed. For example, when an operation is made on the return button RB during display of the paper size screen PS (see FIG. 6), display of the operation display part 40 is changed over to the basic setting screen 410C (see FIG. 3). It is noted that an operation on the return button RB corresponds to a 'return operation' and hereinafter will be referred to as return operation.

After execution of setting operations in the detail setting screen 420, returning to the basic setting screen 410 makes it possible to execute a job based on setting contents set by the setting operations. After the return to the basic setting screen 410, executing a start operation (an operation on the start button 42S) causes the job to be started. For example, after setting of a paper size in the paper size screen PS (see FIG. 6), returning to the copying screen 410C and executing the start operation causes an image to be printed on a paper sheet of the size set in the paper size screen PS.

In addition, in some cases, a user may erroneously display a detail setting screen 420 for not a desired setting item (hereinafter, referred to as first item) but another different setting item (hereinafter, referred to as second item). In this case, it is appropriate to execute a return operation without executing a setting operation for the second item and subsequently getting a display of the detail setting screen 420 for the first item. Thus, it becomes possible to change a set value of the first item from a default value while retaining a set value of the second item at a default value.

<Call Buttons>

The call buttons B are provided in the setting screens 400 as shown in FIGS. 3 to 6. The call buttons B are provided in every setting screen 400.

The plurality of call buttons B are associated with default processes of displaying individual basic setting screens 410 for their corresponding functions, respectively, in the operation display part 40. That is, a default process corresponding to the call button B1 is a process of displaying the copying screen 410C. A default process corresponding to the call button B2 is a process of displaying the sending screen 410S. A default process corresponding to the call button B3 is a process of displaying the box screen 410B.

The panel controller 30 displays, in the operation display part 40, a setting screen 400 for a function designated by a user, and accepts setting operations related to a job of the function corresponding to the setting screen 400 being under display (i.e., the function of user's designation). Then, during the display of the setting screen 400, when an operation is made on a call button B of a function other than the function corresponding to the setting screen 400 being under display, the panel controller 30 executes a default process correspondingly associated with the operated call button B. In addition, during the display of a setting screen 400, even when a call button B of a function corresponding to the setting screen 400 being under display is operated, the panel controller 30 does not execute the default process correspondingly associated with the operated call button B.

Figure 7:
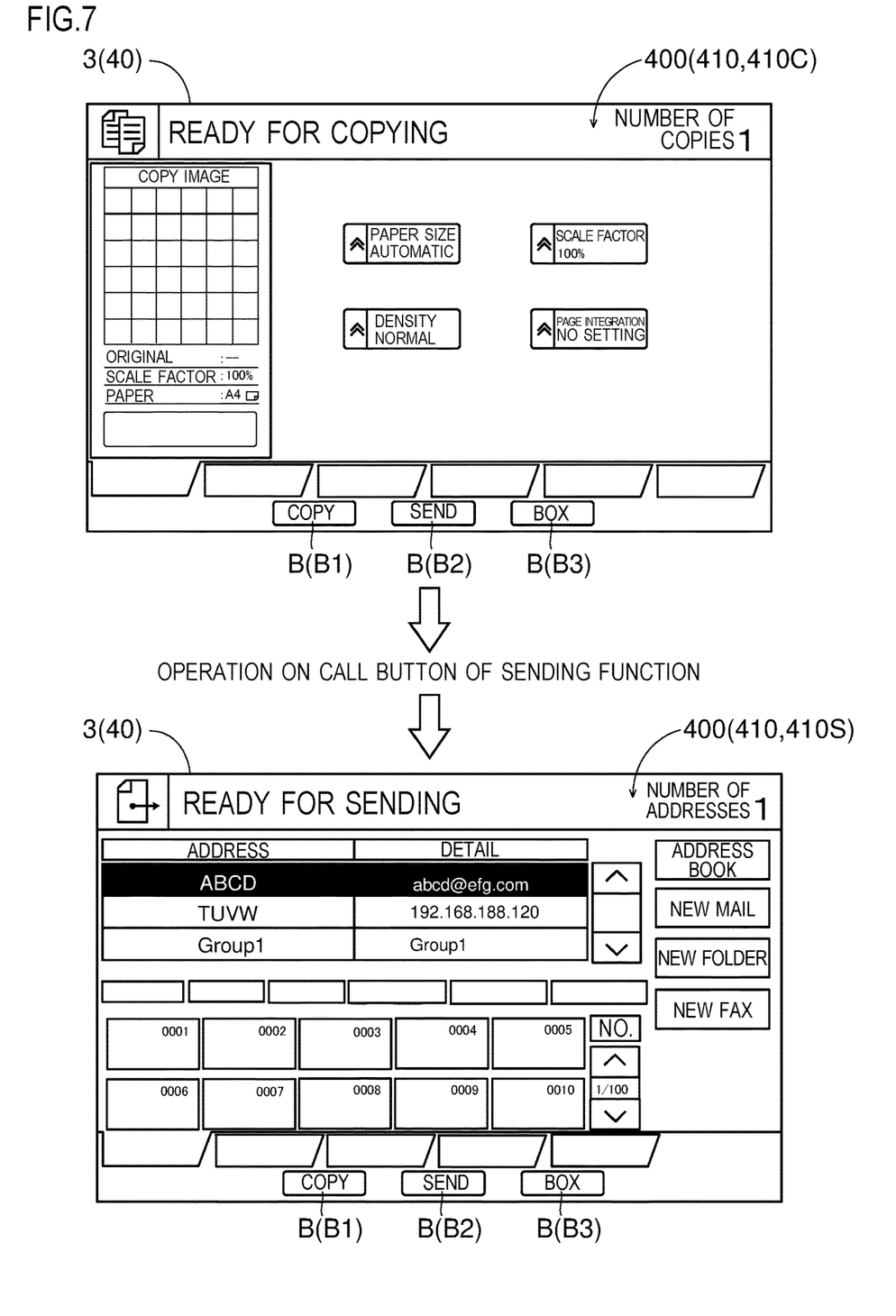
FIG. 7 is a view for explaining a default process to be executed by the operation panel according to one embodiment of the disclosure.

For example, assume that the call button B2 of the sending function is operated while the copying screen 410C is displayed in the operation display part 40 as shown in upper part of FIG. 7. In this case, the panel controller 30 executes the default process correspondingly associated with the call button B2. As a result, the display of the operation display part 40 is changed over from the copying screen 410C to the sending screen 410S as shown in lower part of FIG. 7. Although not shown, when the call button B3 of the box function is operated during the display of the copying screen 410C, the default process correspondingly associated with the call button B3 is executed, causing the display of the operation display part 40 to be changed over from the copying screen 410C to the box screen 410B.

In addition, when the call button B2 of the sending function is operated during the display of the paper size screen PS, the display of the operation display part 40 is changed over from the paper size screen PS to the sending screen 410S. That is, as in the example shown in FIG. 7, the default process correspondingly associated with the call button B2 is executed.

When the call button B1 of the copying function is operated during the display of the sending screen 410S, the default process correspondingly associated with the call button B1 is executed, causing the display of the operation display part 40 to be changed over from the sending screen 410S to the copying screen 410C. When the call button B3 of the box function is operated during the display of the sending screen 410S, the default process correspondingly associated with the call button B3 is executed, causing the display of the operation display part 40 to be changed over from the sending screen 410S to the box screen 410B.

When the call button B1 of the copying function is operated during the display of the box screen 410B, the default process correspondingly associated with the call button B1 is executed, causing the display of the operation display part 40 to be changed over from the box screen 410B to the copying screen 410C. When the call button B2 of the sending function is operated during the display of the box screen 410B, the default process correspondingly associated with the call button B2 is executed, causing the display of the operation display part 40 to be changed over from the box screen 410B to the sending screen 410S.

In all the cases where the call button B1 of the copying function is operated during the display of the copying screen 410C, where the call button B2 of the sending function is operated during the display of the sending screen 410S, and where the call button B3 of the box function is operated during the display of the box screen 410B, the display of the operation display part 40 remains unchanged.

<Changeover of Processes>

Hereinafter, a function of user's designation will be referred to as object function. A setting screen 400 for a function of user's designation is displayed in the operation display part 40. That is, a function corresponding to the setting screen 400 being under display is the object function.

When a user has operated any one of the call buttons B in the home screen (when the user has designated any one of the functions), a basic setting screen 410 for a function corresponding to the operated call button B is displayed, where the function corresponding to the operated call button B becomes the object function. Also, during the display of a setting screen 400 for any one function (hereinafter, expediently referred to as first function), when a call button B of any one function (hereinafter, expediently referred to as second function) other than the first function is operated, the display screen is changed over from the setting screen 400 of the first function to the basic setting screen 410 of the second function. In this case, the object function is changed over from the first function to the second function.

Figure 8:
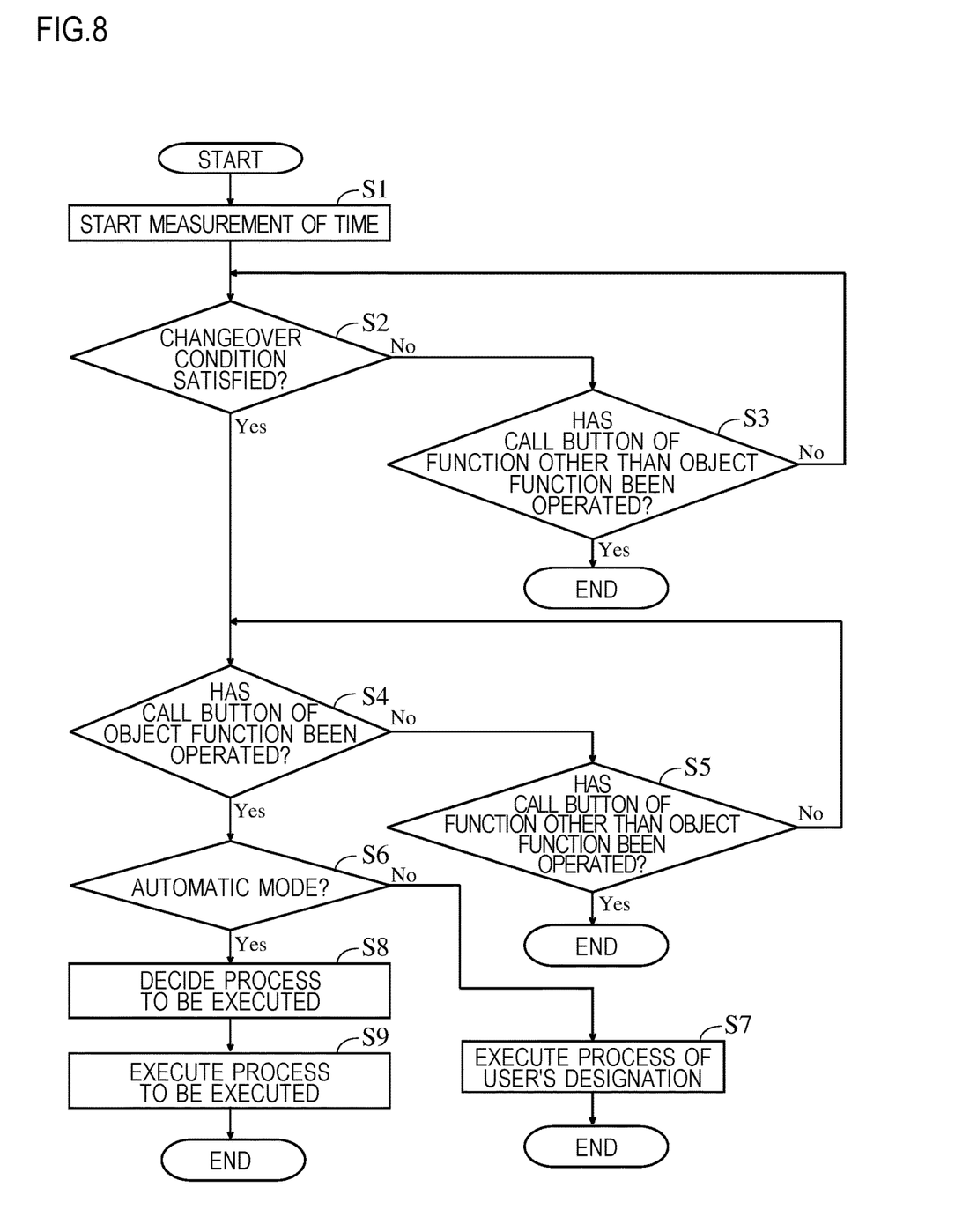
FIG. 8 is a flowchart showing a flow of processing to be executed by a panel controller of the operation panel according to one embodiment of the disclosure.

When the basic setting screen 410 of the object function is displayed in the operation display part 40 on a basis of an operation of any call button B, the panel controller 30 starts a procedure along a flow of FIG. 8. The procedure will be described below in detail.

At step S1, the panel controller 30 starts measurement of time. At step S2, the panel controller 30 decides whether or not a changeover condition has been satisfied. Based on a status of use of the operation display part 40 after execution of a default process subsequent to an operation of any one call button B (i.e., after a start of the display of the basic setting screen 410 of a function corresponding to the operated call button B), the panel controller 30 makes the decision as to whether or not the changeover condition has been satisfied.

For example, it is decided whether any one or none of plural specified conditions has been satisfied. When any one of the specified conditions has been satisfied, the panel controller 30 decides that the changeover condition has been satisfied. In the following description, it is assumed that there are provided three specified conditions, i.e. a first condition, a second condition and a third condition.

1. First Condition

After execution of a default process on a basis of an operation of any one call button B (i.e., after a start of display of a basic setting screen 410 of an object function), when accepting a setting operation during display of any one setting screen 400 of the object function, the panel controller 30 decides that the first condition has been satisfied.

For example, when a user, after having operated the call button B1 to make the copying screen 410C displayed, executes an operation of entering a number of copies by using the ten keys (this operation is recognized as a setting operation), it is decided that the first condition has been satisfied. Until an entering operation with use of the ten keys is executed, it is not decided that the first condition has been satisfied.

Also, for example, when the user, after having operated the call button B1 to make the copying screen 410C displayed, makes the paper size screen PS displayed without executing any setting operation, and executes an operation on the size selection button in the paper size screen PS (this operation is recognized as a setting operation), it is decided that the first condition has been satisfied. In addition, when the user, after having made the paper size screen PS displayed, executes a return operation without executing any setting operation, it is not decided at this point that the first condition has been satisfied. That is, the return operation is not recognized as a setting operation.

2. Second Condition

After execution of a default process on a basis of an operation of any one call button B (i.e., after a start of display of a basic setting screen 410 of an object function), when accepting a setting operation during display of a particular screen out of plural setting screens 400 of the object function, the panel controller 30 decides that the second condition has been satisfied.

For example, out of the plural setting screens 400 of the box function, a detail setting screen 420 for box printing is set as the particular screen. In this case, when the user executes a setting operation during the display of the detail setting screen 420 for box printing (e.g., sets a paper size to be used for the box printing job), it is decided that the second condition has been satisfied.

In addition, the detail setting screen 420 for box sending may also be set as the particular screen. Also, any one of other setting screens 400 of the box function may be set as the particular screen, and furthermore any one of setting screens 400 of other functions may be set as the particular screen.

3. Third Condition

After execution of a default process on a basis of an operation of any one call button B (i.e., after a start of display of a basic setting screen 410 of an object function), when a predetermined threshold time has elapsed without display of any screen other than the plural setting screens 400 of the object function, the panel controller 30 decides that the third condition has been satisfied.

For example, an average time (hereinafter, referred to as first time) required for settings related to a job is previously determined in an experimental or empirical way. Then, the first time is set as a threshold time. In this case, when the user is going to instruct a start of a job (when the user is about to complete settings related a job), it is decided that the third condition has been satisfied. In addition, in a case where the user is still executing settings related to a job when the threshold time (first time) has elapsed since a start of display of the basic setting screen 410 of the object function, it is decided that the third condition has been satisfied. Further, even in a case where the user has gone away without executing any operation after the start of the display of the basic setting screen 410 of the object function, when the threshold time (first time) has elapsed, it is decided that the third condition has been satisfied.

A second time (e.g., a few to ten-odd seconds) shorter than the first time may also be set as the threshold time. In this connection, there are some cases where the user desires to hold settings related to a job as they are default settings. In this case, the user executes no setting operations. That is, after the basic setting screen 410 of the object function is displayed, the user tends to immediately instruct a start of the job. Accordingly, even with the threshold time set to the second time, while the user is going to instruct a start of the job, it may be decided that the third condition has been satisfied.

In addition, out of plural specified conditions, only one or some specified conditions previously selected by a manufacturer or a user may be employed.

Further, it is also allowable that with weight values set for plural specified conditions, respectively, the panel controller 30 decides whether or not the changeover condition has been satisfied, based on weight values of satisfied specified conditions. More specifically, after execution of a default process on a basis of an operation of any one call button B (after a start of display of a basic setting screen 410 of an object function), the panel controller 30 decides whether or not the plural specified conditions have been satisfied, respectively. Further, the panel controller 30 cumulatively totalizes weight values corresponding to satisfied specified conditions each time any one of the specified conditions has been satisfied. Then, when a totalized value of weight values has reached a specified value, the panel controller 30 decides that the changeover condition has been satisfied.

At step S2, when the panel controller 30 decides that the changeover condition has not been satisfied, the processing flow moves on to step S3. For example, after a start of display of the basic setting screen 410 of the object function, on conditions that no setting operation has been executed and that the threshold time has not elapsed, the processing flow moves on to step S3.

Upon transition to step S3, the panel controller 30 decides whether or not a call button B of a function other than the object function has been newly operated. When the panel controller 30 decides that no call button B of a function other than object function has been operated, the processing flow moves on to step S2.

Meanwhile, when the panel controller 30 decides at step S3 that a call button B of a function other than the object function has been newly operated, this processing flow is ended. That is, after the start of the display of the basic setting screen 410 of the object function, on conditions that no setting operation has been executed and that a call button B of a function other than the object function has been newly operated before a lapse of the threshold time, the processing flow is ended. In this case, a function corresponding to the newly operated call button B becomes the object function. Then, the processing along the flow of FIG. 8 is started.

When the panel controller 30 decides at step S2 that the changeover condition has been satisfied, the processing flow moves on to step S4. Upon transition to step S4, the panel controller 30 decides whether or not the call button B of the object function has been operated for a second time. When the panel controller 30 decides that the call button B of the object function has not been operated, the processing flow moves on to step S5.

Upon transition to step S5, the panel controller 30 decides whether or not a call button B of a function other than the object function has been newly operated. When the panel controller 30 decides that no call button B of a function other than the object function has been operated, the processing flow moves on to step S4.

Meanwhile, when the panel controller 30 decides at step S5 that a call button B of a function other than the object function has been newly operated, this processing flow is ended. That is, even after a decision that the changeover condition has been satisfied, on condition that a call button B of a function other than the object function has been newly operated (that the call button B of the object function has not been operated), this processing flow is ended. In this case, a function corresponding to the newly operated call button B becomes the object function. Then, the processing along the flow of FIG. 8 is started.

When the panel controller 30 decides at step S4 that the call button B of the object function has been operated for the second time, the processing flow moves on to step S6. At this time point, no call button B of a function other than object function has been operated. That is, any one setting screen 400 of the object function has been displayed when the call button B of the object function is operated for the second time.

Upon transition to step S6, the panel controller 30 decides whether or not a mode for setting of a process to be executed when a call button B is operated with the changeover condition satisfied is an automatic mode (i.e., whether or not an automatic mode is valid). It is designated by user's discretion whether or not this mode is set to the automatic mode. When the panel controller 30 decides that the mode of user's designation is other than the automatic mode (the automatic mode is invalid), the processing flow moves on to step S7.

Upon transition to step S7, the panel controller 30 assigns a process previously registered by the user to a call button B of the object function. That is, when the call button B of the object function is operated for the second time, the panel controller 30 executes the process previously registered by the user on condition that the mode of user's designation is other than the automatic mode.

When the panel controller 30 decides at step S6 that the mode of user's designation is the automatic mode (i.e., that the automatic mode is valid), the processing flow moves on to step S8. Upon transition to step S8, the panel controller 30 makes a decision as to a process to be executed (executes a decision process). Based on a status of use of the operation display part 40 during a confirmation period lasting from execution of a default process triggered by an operation of any one call button B until a second-time operation of the same call button B (i.e., the call button B of the object function), the panel controller 30 makes a decision as to a process to be executed.

Thereafter, at step S9, the panel controller 30 executes a process so decided by the decision process as to be executed. In other words, the panel controller 30 executes a process corresponding to a status of use of the operation display part 40 during the confirmation period. That is, the panel controller 30 assigns, to the call button B of the object function, a process corresponding to a status of use of the operation display part 40 during the confirmation period.

In making a decision process, the panel controller 30 determines an operating time during the confirmation period. The panel controller 30 measures, as the operating time, a display time of a setting screen 400 that has been displayed at a time when a setting operation is accepted.

For example, assume that a setting operation of setting a paper size is accepted during display of the paper size screen PS. In this case, a time duration from a start until an end of the display of the paper size screen PS is measured as an operating time. In a case where no setting operation has been accepted during the period from the start until the end of the display of the paper size screen PS (i.e., where a return operation has been executed without execution of a setting operation after the display of the paper size screen PS), a display time of the paper size screen PS in this case is not counted as the operating time. Also, assume that a setting operation has been accepted during display of a first setting screen 400 and moreover a setting operation has been accepted during display of a second setting screen 400 as well. In this case, a total time of a display time of the first setting screen 400 and a display time of the second setting screen 400 becomes the operating time.

After determining an operating time during the confirmation period, the panel controller 30 decides whether or not the operating time is equal to or more than a predetermined reference time. Then, when deciding that the operating time is equal to or more than the reference time, the panel controller 30 assigns a process of starting a job of the object function to a call button B of the object function. That is, when the call button B of the object function is operated for a second time, the panel controller 30 transmits to the main controller 10 an operation signal indicating acceptance of an instruction for a job start (executes a process of starting a job of the object function). As a result of this, the job of the object function is started.

In this case, that the operating time has become equal to or more than the reference time implies that the user is highly likely to instruct a start of the job. Therefore, in a case where the operating time has become equal to or more than the reference time, it is preferable, in terms of user's convenience, that the process of starting a job is assigned to a call button B of the object function. Conveniently, from the user's viewpoint, operating a software button (call button B) on the screen for the second time allows the job to be started.

In executing a decision process, the panel controller 30 decides whether or not a setting operation has been accepted during the confirmation period. The panel controller 30 also decides whether or not a start operation has been accepted during the confirmation period. As a result, in a case where a setting operation has been accepted while a start operation has not been accepted, the panel controller 30 assigns a process of starting a job of the object function to a call button B of the object function. That is, when the call button B of the object function is operated for the second time, the panel controller 30 executes the process of starting the job of the object function.

In this case, that a setting operation has been executed while a starting operation has not been executed implies that the user is highly likely to be going to instruct a start of a job. Therefore, assigning the process of starting a job of an object function to a call button B of the object function contributes to improvement of user's convenience.

Also in executing a decision process, the panel controller 30 recognizes a number of canceling operations (number of canceling times) executed during the confirmation period. When a return operation is executed without execution of any setting operation during display of any one setting screen 400, the panel controller 30 decides that a canceling operation has been executed.

After recognizing a number of canceling times during the confirmation period, the panel controller 30 decides whether or not the number of canceling times is equal to or more than a predetermined threshold number. Then, when deciding that the number of canceling times is equal to or more than the threshold number, the panel controller 30 assigns, to a call button B of the object function, a process of displaying the basic setting screen 410 of the object function while retaining setting contents set by setting operations during the confirmation period. That is, when the call button B of the object function is operated for the second time, the panel controller 30 displays the basic setting screen 410 of the object function in the operation display part 40 while retaining the setting contents set during the confirmation period.

In addition, in the case where the number of canceling times executed during the confirmation period is equal to or more than the threshold number, even when a setting operation has been executed during the confirmation period, the panel controller 30 executes a process of displaying the basic setting screen 410 of the object function in the operation display part 40 without executing the process of starting the job of the object function.

In this case, that the number of canceling times has become equal to or more than the threshold number implies that the user is highly likely to be lingering in job setting. For example, when the user does not find a software button for displaying a setting screen 400 of a desired setting item, the user repeats the canceling operation over and over again. As a result, the number of canceling times becomes equal to or more than the threshold number. After display of one detail setting screen 420, when the displayed detail setting screen 420 is other than a detail setting screen 420 of a desired setting item, the user returns the display screen to the basic setting screen 410 (executes a canceling operation) and subsequently makes another detail setting screen 420 displayed.

Accordingly, in a case where the number of canceling times has become equal to or more than the threshold number, it is preferable to assign, to a call button B of the object function, the process of displaying the basic setting screen 410 of the object function while retaining setting contents set by the setting operations. As a result of this, operating a software button (call button B) on the screen for the second time allows the basic setting screen 410 to be displayed conveniently for the user. Also, even when a setting of another setting item has been executed before the call button B is operated for the second time, the setting contents of that setting item are kept from being reset.

Also in executing a decision process, the panel controller 30 decides whether or not the operation display part 40 has been operated during a period between a time point (hereinafter, referred to as second time point) when the call button B of the object function is operated for a second time and another time point (hereinafter, referred to as first time point) which ascends therefrom by a specified time. In other words, the panel controller 30 decides whether or not an unoperated time that has elapsed with the operation display part 40 remaining out of operation has reached a specified time. As a result, when the operation display part 40 has not been operated during the period from the first time point until the second time point, the panel controller 30 resets setting contents set by setting operations during the confirmation period and assigns, to a call button B of the object function, a process of displaying the basic setting screen 410 of the object function. That is, when the call button B of the object function is operated for the second time, the panel controller 30 resets setting contents set during the confirmation period (returns individual set values of all the setting items to their default values). Then, the panel controller 30 displays the basic setting screen 410 of the object function in the operation display part 40.

In addition, in the case where the operation display part 40 has not been operated during the period from the first time point until the second time point, even when the operation display part 40 has been operated during a period which is within the confirmation period and which is out of the period from the first time point until the second time point, the panel controller 30 preferentially executes the process of resetting the setting contents set during the confirmation period and displaying the basic setting screen 410 of the object function.

In this case, that the operation display part 40 has not been operated during the period from the first time point until the second time point (i.e., unoperated time has reached the specified time) implies a high likelihood that a user, after completing a job, has gone away with the setting screen 400 of the object function remaining displayed and thereafter another user has operated a call button B. It is also highly likely that a user relevant to a preceding-job request has gone away without resetting setting contents. In this case, for execution of settings related to a current job, existing setting contents need to be reset.

Accordingly, when the operation display part 40 has not been operated during the period from the first time point until the second time point, it is preferable to assign, to a call button B of the object function, the process of resetting setting contents set by setting operations and displaying the basic setting screen 410 of the object function. As a result of this, the need for separately executing the operation of resetting the setting contents is eliminated, conveniently from the user's viewpoint.

In this case, in a case where the changeover condition has been satisfied, it is allowable to display, in the operation display part 40, process content information indicative of process contents to be executed when the call button B of the object function is operated for the second time. As a result, even when a process other than the default process is assigned to the call button B of the object function, the user is allowed to recognize a process that is currently assigned to the object function. This configurational feature will be described hereinbelow on a case in which the object function is the copying function.

For example, it is assumed that the call button B1 of the copying function has been operated, causing the copying screen 410C to be displayed. It is also assumed that a user has executed setting operations during the display of the copying screen 410C.

Figure 9:
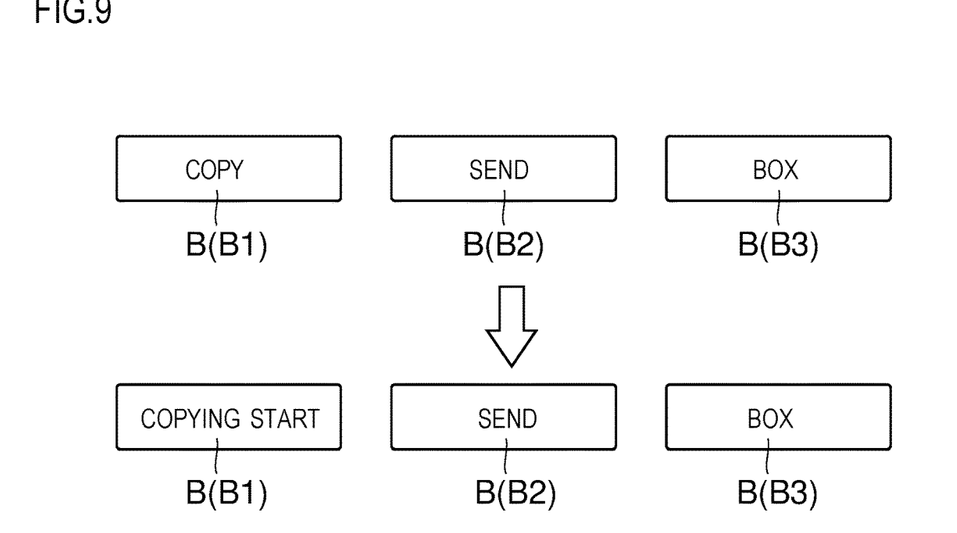
FIG. 9 is a view showing a transition of display contents in a call-button area of the operation panel according to one embodiment of the disclosure.

In this case, when the user operates the call button B1 during the display of the copying screen 410C, a copying job is started. Then, the panel controller 30 displays in the operation display part 40, as process content information, information indicating that operating the call button B1 causes a copying job to be started. For example, as shown in FIG. 9, display contents within a display area of the call button B1 may be changed from a state of the upper view to another state of the lower view. That is, a text image 'COPYING START' may be displayed in the display area of the call button B1.

Also, for example, assume that the call button B1 of the copying function has been operated, causing the copying screen 410C to be displayed. Further, assume that a time duration having elapsed with the operation display part 40 remaining out of operation has reached a specified time during the display of the copying screen 410C.

Figure 10:
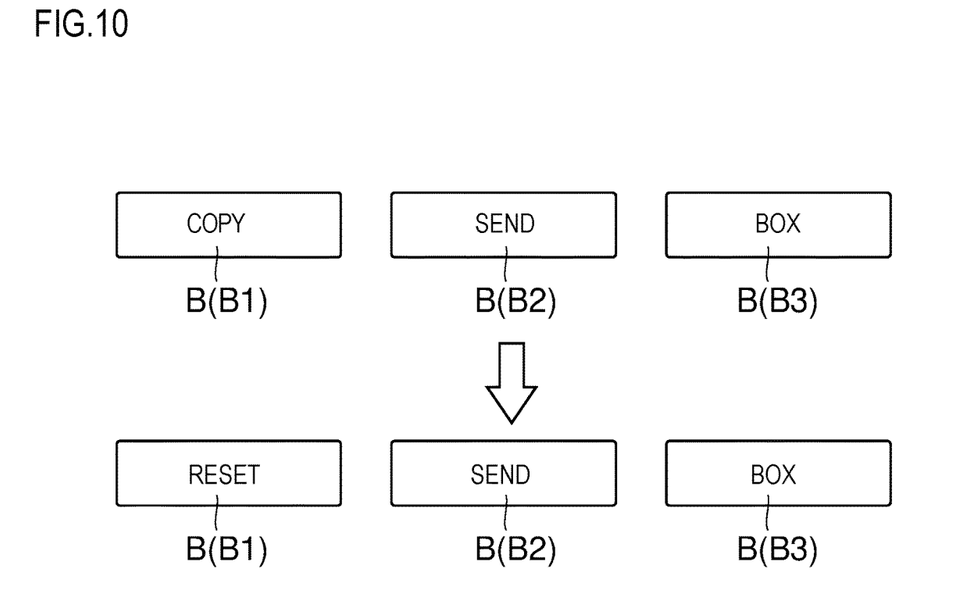
FIG. 10 is a view showing a transition of display contents in the call-button area of the operation panel according to one embodiment of the disclosure.

In this case, when the user operates the call button B1 during the display of the copying screen 410C, setting contents are reset. Accordingly, the panel controller 30 displays, as the process content information, information indicating that operating the call button B1 causes the setting contents to be reset. For example, as shown in FIG. 10, display contents within the display area of the call button B1 may be changed from a state of the upper view to another of the lower view. That is, a text image 'RESET' may be displayed in the display area of the call button B1.

In addition, some users may desire that the process assigned to the call button B of the object function be held as it is a default process. Accordingly, on condition that the changeover condition is satisfied, the panel controller 30 instructs the operation display part 40 to accept whether or not a changeover of a process assigned to the call button B of the object function is permitted. Then, only when a permission of the changeover is accepted, the panel controller 30 assigns a process other than the default process to the call button B of the object function. With this configurational feature, there can be suppressed a possibility that a user's unintended process may be executed when the user has operated the call button B of the object function.

For example, although not shown, when the panel controller 30 decides that the changeover condition has been satisfied, the operation display part 40 displays a dialog box in pop-up form. A permit button and a forbid button are provided in the dialog box. When detecting an operation on the permit button, the panel controller 30 assigns, to the call button B of the object function, a process other than the default process. On the other hand, when detecting an operation on the forbid button, the panel controller 30 holds the default process still assigned to the call button B of the object function.

As described above, with the configuration of this embodiment, the panel controller 30 decides whether or not the changeover condition has been satisfied during display of a setting screen 400 of an object function. Then, in a case where a call button B of the object function has been operated for a second time during the display of the setting screen 400 of the object function, on condition that the changeover condition has been satisfied, the panel controller 30 executes a process corresponding to a status of use of the operation display part 40 during the confirmation period lasting from execution of a default process triggered by an operation of the call button B of the object function until a second-time operation of the call button B of the object function. That is, with the configuration of this embodiment, the panel controller 30 assigns, to the call button B of the object function, a process corresponding to a status of use of the operation display part 40 during the confirmation period. Thus, it becomes possible to effectively utilize the call buttons B.

More specifically, in a case where the changeover condition has been satisfied, the panel controller 30 determines an operating time during the confirmation period, where on condition that the operating time is equal to or more than a predetermined reference time, when the call button B of the object function is operated for the second time, the panel controller 30 executes a process of starting a job of the object function. Further in the case where the changeover condition has been satisfied, on condition that a setting operation has been accepted during the confirmation period and moreover a start operation has not been accepted, the panel controller 30 executes a process of starting the job of the object function when the call button B of the object function is operated for the second time. That is, in a case where the user is highly likely to instruct a job start, the process of starting the job of the object function is assigned to the call button B of the object function. Thus, the user's convenience is improved.

Also in the case where the changeover condition has been satisfied, on condition that the number of canceling operations executed during the confirmation period is equal to or more than a predetermined threshold number, when the call button B is operated for the second time, the panel controller 30 executes a process of displaying the basic setting screen 410 while holding setting contents set by setting operations. That is, when the user is highly likely to be lingering in job setting, a process of displaying the basic setting screen 410 of the object function is assigned to a call button B of the object function. As a result of this, the display screen can be returned to the basic setting screen 410 at a stroke, hence improvement of convenience for the user lingering in settings.

Further in the case where the changeover condition has been satisfied, on condition that the operation display part 40 has not been operated during a period between a time point at which the call button B of the object function has been operated for the second time and another time point which ascends therefrom by a specified time, when the call button B is operated for the second time, the panel controller 30 executes a process of resetting setting contents set by setting operations and displaying the basic setting screen 410. As a result of this, settings for a precedently executed job, even when having been held, are reset, hence improvement of user's convenience.

Also with the configuration of this embodiment, based on a status of use of the operation display part 40 after execution of a default process triggered by an operation of a call button B, the panel controller 30 decides whether or not the changeover condition has been satisfied. As a result, there can be suppressed a possibility that a process assigned to the call button B may unnecessarily be changed. For example, there is no possibility that a process other than the default process may be assigned to the call button B during the display of the home screen.

Figure 11:
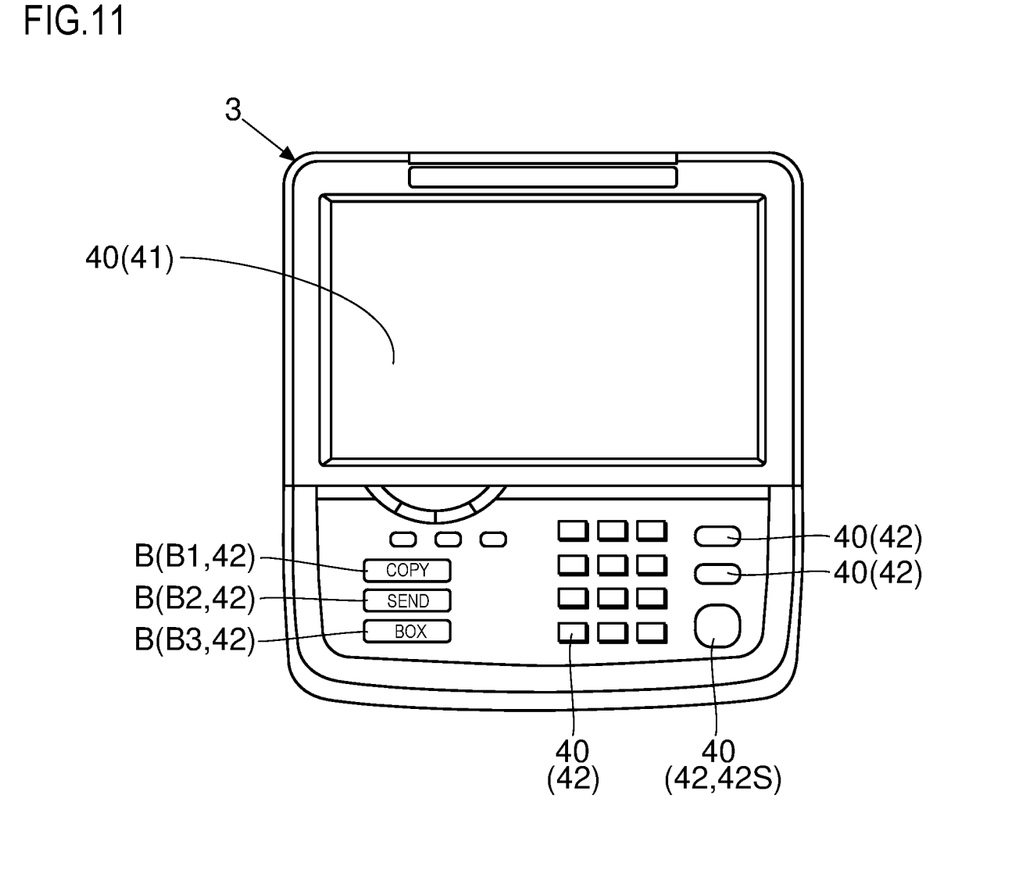
FIG. 11 is a view showing a configuration of an operation panel according to one modification of the disclosure.
Figure 12:
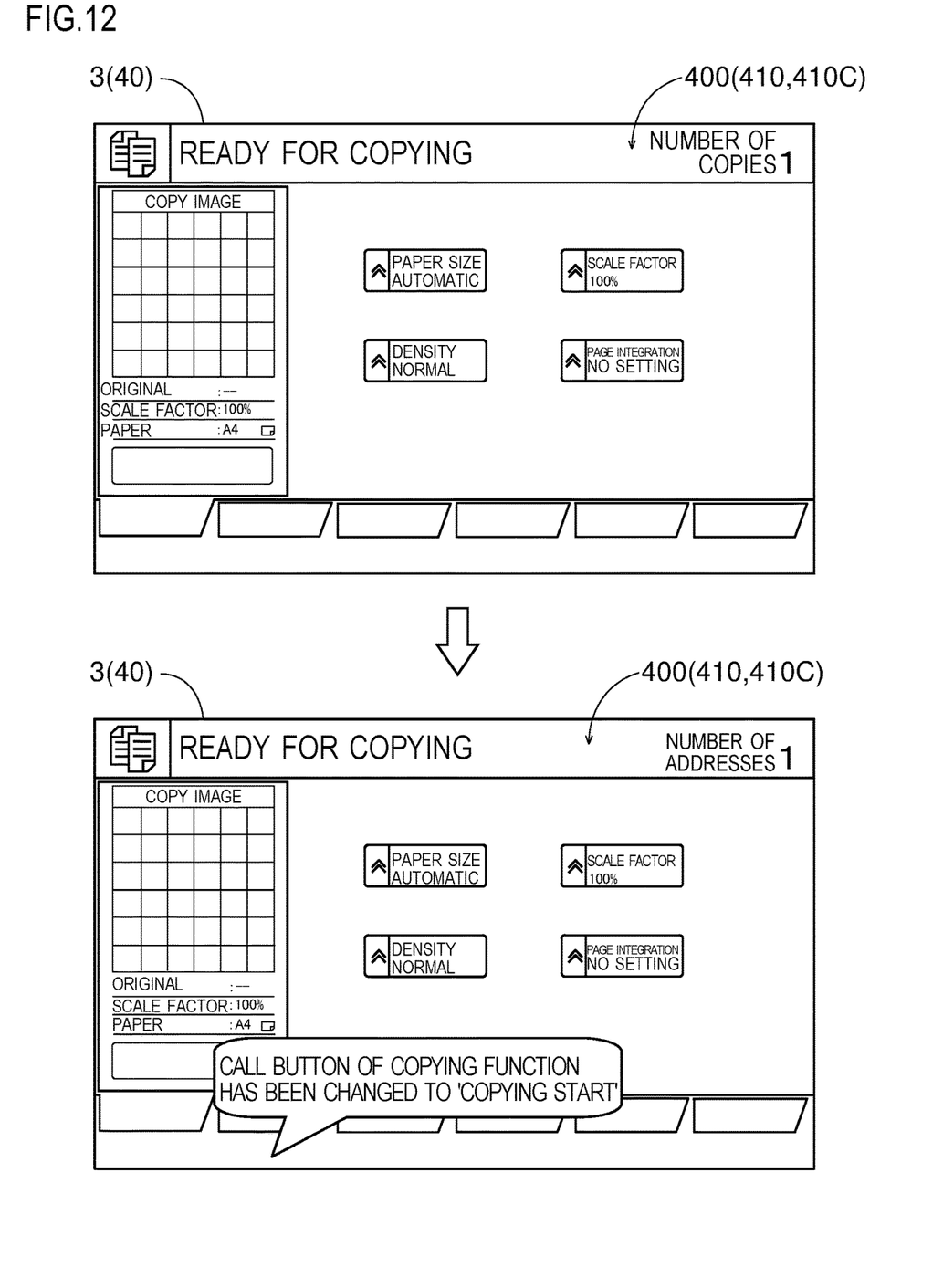
FIG. 12 is a view showing processing content information to be displayed on the operation panel according to the modification of the disclosure.

In addition, in the above-described embodiment, a plurality of call buttons B are implemented by software buttons. However, this configuration is not limitative. For example, as shown in FIG. 11, the plurality of call buttons B may also be implemented by hardware buttons 42, as a modification example. In the modification example, since the plurality of call buttons B are implemented by the hardware buttons 42, no call buttons B are provided in the setting screen 400, as shown in FIG. 12.

In the above embodiment, in the case where the changeover condition has been satisfied, process content information indicating contents of the process to be executed when each call button B of the object function is operated for the second time is displayed within the display area of the call button B (software button) of the object function. However, in the modification example, the call buttons B are implemented by the hardware buttons 42. Therefore, in the modification example, the panel controller 30 displays the process content information in pop-up form in the operation display part 40. For example, in a case where a copying job is started upon operation of the call button B of the copying function, there occurs a transition from a state of the upper view to another state of the lower view in FIG. 12.

The rest of the configuration of the modification example is identical to that of the above embodiment.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. A display input device comprising:
an operation display part for displaying information thereon and accepting operations from a user;
a call button correspondingly associated with a default process of displaying, in the operation display part, a setting screen for accepting a setting operation related to a job of a function of user's designation; and
a controller for, when the call button is operated while another screen other than the setting screen is displayed in the operation display part, executing the default process correspondingly associated with the call button to make the setting screen displayed in the operation display part, wherein
the controller decides whether or not a changeover condition has been satisfied during display of the setting screen, and in a case where the call button is operated for a second time during the display of the setting screen, on condition that the changeover condition has been satisfied, the controller executes a process corresponding to a status of use of the operation display part during a confirmation period lasting from execution of the default process triggered by an operation of the call button until the second-time operation of the call button.

2. The display input device according to claim 1, wherein based on a status of use of the operation display part after execution of the default process triggered by an operation of the call button, the controller decides whether or not the changeover condition has been satisfied.

3. The display input device according to claim 2, wherein upon accepting the setting operation during display of the setting screen after execution of the default process triggered by an operation of the call button, the controller decides that the changeover condition has been satisfied.

4. The display input device according to claim 2, wherein the setting screen is provided in plurality, and
upon accepting the setting operation during display of a particular screen out of the plural setting screens after execution of the default process triggered by an operation of the call button, the controller decides that the changeover condition has been satisfied.

5. The display input device according to claim 2, wherein when a predetermined threshold time has elapsed without display of the another screen after execution of the default process triggered by an operation of the call button, the controller decides that the changeover condition has been satisfied.

6. The display input device according to claim 2, wherein after execution of the default process triggered by an operation of the call button, the controller decides whether or not each one of plural specified conditions has been satisfied, while the controller totalizes on and on weight values corresponding to satisfied ones of the specified conditions, where when a totalized value of the weight values has reached a specified value, the controller decides that the changeover condition has been satisfied.

7. The display input device according to claim 1, wherein the controller measures, as an operating time, a display time of the setting screen that has been displayed when the setting operation is accepted, and
in a case where the changeover condition has been satisfied, on condition that the operating time during the confirmation period is equal to or more than a predetermined reference time, the controller executes a process of starting the job when the call button is operated for a second time.

8. The display input device according to claim 1, further comprising
a start button for accepting a start operation of instructing a start of the job, wherein
in a case where the changeover condition has been satisfied, on condition that during the confirmation period the setting operation has been accepted while the start operation has not been accepted, the controller executes a process of starting the job when the call button is operated for a second time.

9. The display input device according to claim 1, wherein the setting screen is provided in plurality,
the default process is a process of displaying, in the operation display part, a basic setting screen out of the plural setting screens,
when accepting a specified return operation during display of the setting screen, the controller displays, in the operation display part, one of the setting screens which is higher in hierarchical order than the setting screen being under display, when the return operation is executed without execution of the setting operation during display of the setting screen, the controller decides that a canceling operation has been executed, and in a case where the changeover condition has been satisfied, on condition that a number of times of the canceling operation executed during the confirmation period is equal to or more than a predetermined threshold number, the controller executes a process of displaying the basic setting screen while retaining setting contents set by the setting operation when the call button is operated for a second time.

10. The display input device according to claim 1, wherein the setting screen is provided in plurality, the default process is a process of displaying, in the operation display part, a basic setting screen out of the plural setting screens, in a case where the changeover condition has been satisfied, on condition that the operation display part has not been operated during a period between a time point of a second-time operation of the call button and a time point ascending therefrom by a specified time, the controller executes a process of resetting setting contents set by the setting operation and displaying the basic setting screen when the call button is operated for the second time.

11. The display input device according to claim 1, wherein the controller decides whether or not a mode for setting a process which is to be executed upon an operation of the call button effectuated with the changeover condition satisfied is an automatic mode, in a case where the changeover condition has been satisfied, on condition that the mode is the automatic mode, the controller, when the call button is operated for a second time, executes a process corresponding to a status of use of the operation display part during the confirmation period, and in a case where the changeover condition has been satisfied, on condition that the mode is other than the automatic mode, the controller, when the call button is operated for a second time, executes a process previously registered by a user.

12. The display input device according to claim 1, wherein in a case where the changeover condition has been satisfied, the controller displays, in the operation display part, information indicative of contents of a process to be executed when the call button is operated for a second time.

13. An image forming apparatus comprising:

the display input device as defined in claim 1; and a printing part which prints an image on a sheet.

* * * * *